United States Patent
Beyabani (10) Patent No.: US 8,656,444 B2
(45) Date of Patent: Feb. 18, 2014

(54) SYSTEM FOR PROACTIVELY TROUBLESHOOTING SET TOP BOX ISSUES

(75) Inventor: Syed Zafar Beyabani, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 795 days.

(21) Appl. No.: 12/164,547

(22) Filed: Jun. 30, 2008

(65) Prior Publication Data

US 2009/0328098 A1    Dec. 31, 2009

(51) Int. Cl.
- H04N 7/173   (2011.01)
- H04L 12/28   (2006.01)
- H04L 12/26   (2006.01)
- H04L 1/00    (2006.01)

(52) U.S. Cl.
USPC ........... 725/119; 725/120; 725/124; 725/125; 370/242; 370/254; 370/256; 714/4.1; 714/25

(58) Field of Classification Search
USPC .......... 725/37, 39, 46, 50, 51, 107, 109, 112, 725/136, 135; 455/67.14, 69; 370/241–256; 709/223–224; 714/4, 27, 43–44, 47, 714/56, 4.1, 4.27, 48
See application file for complete search history.

(56) References Cited

U.S. PATENT DOCUMENTS

| | | | | |
|---|---|---|---|---|
| 5,606,669 A * | 2/1997 | Bertin et al. | | 709/223 |
| 7,032,016 B2 * | 4/2006 | Cerami et al. | | 709/223 |
| 7,467,067 B2 * | 12/2008 | Marvasti | | 702/186 |
| 2003/0151621 A1 * | 8/2003 | McEvilly et al. | | 345/744 |
| 2004/0054771 A1 | 3/2004 | Roe et al. | | |
| 2004/0088734 A1 * | 5/2004 | Donlan et al. | | 725/109 |
| 2005/0183130 A1 | 8/2005 | Sadja et al. | | |
| 2007/0136476 A1 * | 6/2007 | Rubinstein | | 709/227 |
| 2007/0162932 A1 * | 7/2007 | Mickle et al. | | 725/37 |
| 2008/0077358 A1 | 3/2008 | Marvasti | | |

FOREIGN PATENT DOCUMENTS

WO    WO-2002/082814    10/2002

* cited by examiner

Primary Examiner — Hai V Tran (57) ABSTRACT

A system for proactively troubleshooting set top box issues may include a media distribution network with a remote requesting device and a programming guide server. The programming guide server may be configured to identify a guide data retrieval profile of the requesting device, compare the guide data retrieval profile to an expected profile, and flag the requesting device for troubleshooting based on a lack of correspondence between the retrieval profile and the expected profile. Additionally methods for discovering related devices, predicting that the related devices also require troubleshooting, and limiting restorative measures to only those devices that have been confirmed to be affected by a service issue may also be implemented by the system.

17 Claims, 4 Drawing Sheets

SYSTEM FOR PROACTIVELY TROUBLESHOOTING SET TOP BOX ISSUES

BACKGROUND

Customer service related expenses can impose significant costs for a subscriber based media and telecommunication system. Such expenses may include staffing a telephone support helpdesk to answer and address customer service issues. Additionally, issues that cannot be resolved by phone may require a technician to make an on-site visit to the subscriber or customer. Training support staff and technicians may further add to customer service expenses.

Many subscriber based media and telecommunication systems, or simply subscriber based systems, deliver media content to customers with a content processing device such as a set top box (STB). As the interface between the customer and the subscriber based system, the STB frequently may be the source of customer service issues. Accordingly, customer service expenses may be reduced by identifying and handling service issues involving STBs before the customer discovers the issue.

DETAILED DESCRIPTION

Exemplary illustrations of a system for proactively troubleshooting set top box issues are described below. In the interest of clarity, not all features of an actual implementation are described in this specification. It will of course be appreciated that in the development of any such actual illustration, numerous implementation-specific decisions must be made to achieve the specific goals of the developer, such as compliance with system-related and business-related constraints that will vary from one implementation to another. Moreover, it will be appreciated that such a development effort might be complex and time-consuming, but would nevertheless be a routine undertaking for those having the benefit of this disclosure.

Referring now to the drawings wherein like numerals indicate like or corresponding parts throughout the several views, exemplary illustrations are provided.

Figure 1:
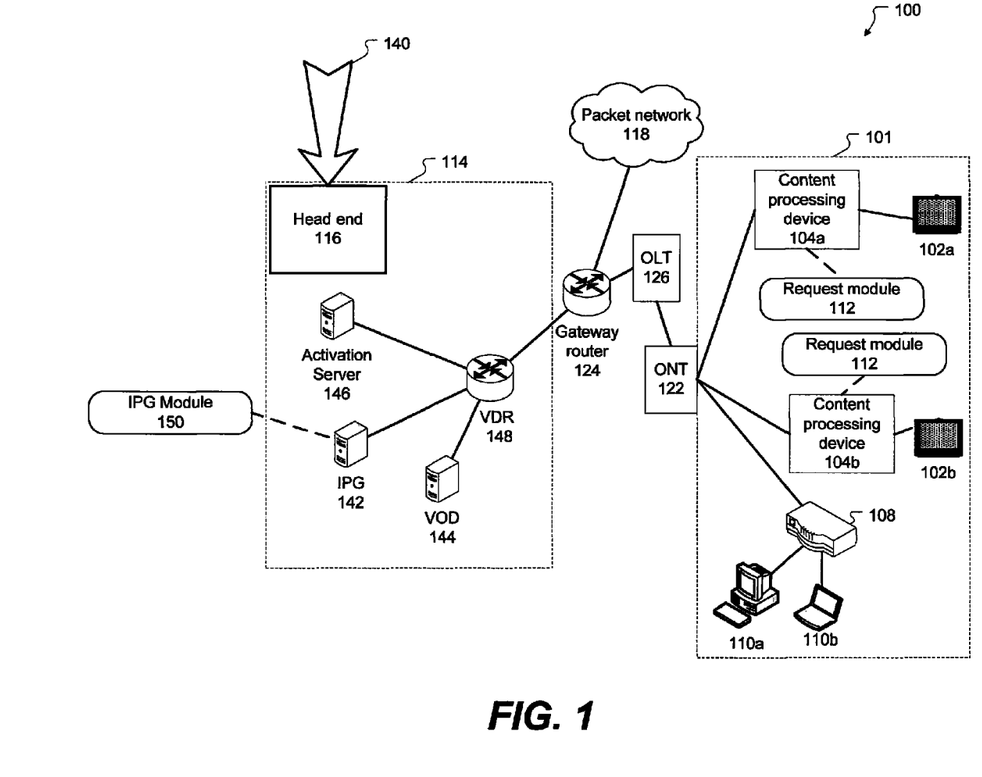
FIG. 1 is a system diagram of a system for proactively troubleshooting set top box issues.

FIG. 1 illustrates an exemplary system 100 for proactively troubleshooting set top box issues. Details of the elements depicted in the figures are included following a brief functional overview of the system 100. Customer service issues for subscriber based systems, e.g., cable and fiber optic television systems, frequently relate to content processing devices, or so-called set top boxes (STB). The behavior and activities of the STB may be monitored to proactively detect service issues prior to receiving a service call from a customer. Moreover, the STB may communicate with other elements of the multimedia subscriber system in an anticipated and regular manner. Accordingly, by reviewing the communications of the STB, anomalies may be recognized as indicative of a service issue.

In one exemplary approach, communications between the STB and an interactive programming guide server may be logged and reviewed for anomalies. Comparisons between an expected set of communications and an actual set of communications may be made in order to recognize the anomalies and subsequently flag the STB for troubleshooting. The hierarchical network architecture of subscriber based systems may allow for a problem with one device to predict a problem with another device associated with common node of the network at a higher level in the hierarchy. Accordingly, the hierarchical relationships of the network devices, including the STBs, may be analyzed to discover other STBs that may be in need of troubleshooting and restorative measures. To confirm the prediction, logs of the communications between the discovered STB and the interactive programming guide server may be reviewed for anomalies. Confirming the prediction may allow troubleshooting and restorative measures to be limited to only those STBs actually affected by a service issue, which may improve customer service by avoiding unnecessary STB maintenance.

Turning now to FIG. 1, an exemplary system 100 for proactively troubleshooting set top box issues. The system 100 generally includes a customer premises network 101 in which media content 140 (e.g., media programming such as interactive or streamed media content), including any one or more of text, images, audio, video, multimedia, etc., may be provided to a media playback device 102 through a content processing device 104 attached to a customer premises network 101. The customer premises network 101 may receive media content 140 from a head end 116 via a media distribution network 114.

The customer premises network 101 may encompass one or more devices within a customer premises such as one or more content processing devices 104*a*-*b*. The content processing device 104 may be a set top box (STB) or similar device for receiving a media signal from a network and for providing media content programming, e.g., audio, video, interactive content, etc., to a media playback device 102. The content processing device 104 may be controlled by a user through any control mechanism, e.g., a remote control (not shown), thereby facilitating the selection and playing of content 140 through the media playback device 102. A control mechanism may include numeric keys for selecting channels of video programming, as well as other keys for making selections and requests according to menus displayed on the media playback device 102, in addition to arrow keys and the like for selecting channels and items in a menu, changing volume levels, etc. An example of the content processing device 104 is set top box model number QIP6400 made by Motorola, Inc. of Schaumburg, Ill.

A router 108 may establish and operate, or at least connect to, a network such as a home network or local area network (LAN), and may route certain communications within customer premises network 101. The router 108 may provide connections to one or more computing devices 110. For example the computing devices 110 may be connected to the router 108 using a wireless connection, a network cable such as a "Cat5" cable, or the like. Further, the computing devices 110 are each uniquely addressable by the router 108 according to a networking protocol. For example, in one exemplary approach, Dynamic Host Configuration Protocol (DHCP) in combination with Network Address Translation (NAT) may dynamically assign Internet Protocol (IP) addresses to computing devices 110. In one exemplary approach, the assigned IP addresses may only be accessible to devices such as devices 110 that are part of the customer premises network 101 via the router 108.

The media playback devices 102a, 102b may include a variety of equipment alone or in combination, such as a video receiver, including a conventional television or a hi-definition television (HDTV), audio equipment including an amplifier and speakers, or devices that incorporate the capability to simultaneously, or near simultaneously, process different types of media content 140 such as video, audio, text data, etc. The media playback device 102 may be connected to, and receive media content from, the content processing device 104.

In the illustrated exemplary system 100, fiber optic cable may be used to provide both different data streams including at least on data stream representing media content 140 to the customer premises network 101. An alternative data stream may be directed to router 108 for consumption by one or more devices 110, the data stream also potentially including media content 140 and one or more of the features discussed below.

An optical line terminal (OLT) 126 may serve as a terminus for an optical network or an optical line. The OLT 126 may provide data, including media content 140, to one or more optical network terminals (ONTs) 122. The ONT 122 is generally situated adjacent to a customer premises, for the purpose of providing data received over an optical line to customer premises network 101, including content processing device 104. The ONT 122 may further bridge the network connection to a coaxial cable based network within the customer premises. One or more fiber distribution hubs (not shown) including an optical splitter may be positioned within the system 100, e.g., between the OLT 126 and the ONT 122. For example, the fiber distribution hub may split a main fiber feed going into a neighborhood, or like collection of customers, to provide individual fiber lines to the ONT 122 serving a particular customer premises 101.

A gateway router 124 allows content processing device 104 to access the media distribution network 114 as well as a packet network 118, e.g. the Internet. By communicating with router 124, content processing device 104 is able to obtain a network address such as an internet protocol (IP) address, thereby enabling content processing device 104 to make requests to and to receive data from, an IPG server 142, and VOD server 144. The gateway router 124 may interconnect the customer premises network 101 with the media distribution network 114, as well as with the packet network 118. Accordingly, FIG. 1 illustrates a hybrid network system 100 in which media content 140 is transported over media distribution network 114 and alternative data is transported over the packet network 118, both data streams being received by customer premises network 101 through a fiber optic line. However, it should be understood that other approaches are envisioned in which the content processing device 104 receives both data streams by way of media other than fiber optic cables to customer premises network 101.

In an exemplary approach, the media distribution network 114 is a network for delivering media content 140 to the customer premises network 101. For example, the network 114 may include hardware and software for providing media content 140 via coaxial cable and/or fiber optic cable, and network equipment, e.g., routers, switches, etc., as described further below. The media content 140 may be provided to the media distribution network 114 from a head end 116, which collects, aggregates, formats, and encodes the content according to the requirements of the media distribution network 114.

Various elements may be included as part of media distribution network 114 to provide media or other information to content processing device 104. A video distribution router (VDR) 148 may provide network connectivity to the elements of the media distribution network 114, and may further connect with the gateway router 124. For example, an interactive program guide (IPG) server 142 may selectively communicate through routers 124, 148 to provide an interactive program guide to the content processing device 104. A video on demand (VOD) server 144, for providing telecommunications customers with video content "on demand," may also be provided to selectively communicate with content processing device 104, generally via media distribution network 114. Additionally, an activation server 146 may be provided to generally authorize and provision content processing device 104. For example, entitlement management data (EMM) may flow from activation server 146 when content processing device 104 is initially set up or placed in communication with system 100. EMM data may be provided by a service provider to authorize certain video content, e.g., subscriptions or packages of channels, to be decoded by content processing device 104, thereby generally preventing access from an unauthorized device. The IPG server 142, VOD server 144, and activation server 146 may selectively communicate with content processing device 104 via Video Distribution Router (VDR) 148, which links servers 142, 144, 146 with media distribution network 114.

A request module 112 may include software instructions, or the like, for controlling at least some aspects of the content processing device 104. As illustrated, the request module 112 may be a software component implemented by the content processing device 104. The request module may be configured to retrieve programming guide data 205 (FIG. 2) from the IPG server 142. The request module 112 may communicate with an IPG module 150. The IPG module may include software instructions, or the like, for controlling at least some aspects of the IPG server 142. The request module 112 may be may be a software component implemented by the IPG server 142 and configured to receive and handle requests for programming guide data 205. Exemplary interactions between the request module 112 and the IPG module 150 will be discussed below with respect to FIG. 2.

The media distribution network 114 and the packet network 118 are generally Internet protocol (IP) networks. As such, networks 114 and 118 generally use one or more internetworking protocols for transporting data, such as user datagram protocol (UDP), transport control protocol (TCP), hypertext transfer protocol (HTTP), etc. Further, networks 114 and 118 may include a variety of networks such as a wide area network (WAN), e.g., the Internet, a local area network (LAN), etc. The networks 114 and 118 may be used to transport a variety of data, including multimedia data such as audio data and video data. Accordingly, it is to be understood that other approaches are envisioned in which networks 114 and 118 are in fact combined into a single network, or in which media distribution network 114 is simply omitted, wherein the packet network 118 is used to provide media content 140 to content processing device 104.

Figure 2:
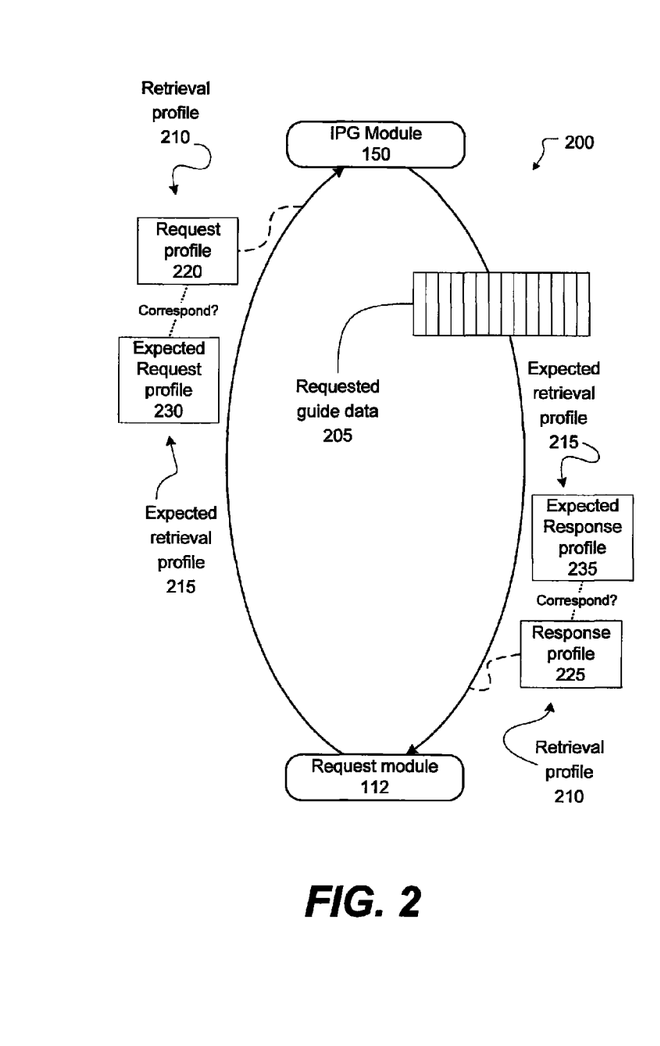
FIG. 2 is an exemplary dataflow diagram depicting the delivery of programming guide data.

FIG. 2 illustrates an exemplary dataflow 200 of the delivery of programming guide data 205 to a content processing device 104. The dataflow 200 includes the request-response cycle between the request module 112 and the IPG module 150. As explained above, the IPG module 150 may receive and handle requests for programming guide data 205. The request module 112, operating on the content processing device 104 may initiate requests for the programming guide data 205 on a periodic basis. In one exemplary approach, the request for guide data 205 may occur on a daily basis. The particular timing of the request may be coordinated with requests from other content processing devices 104 to avoid over burdening the IPG server 142.

Guide data 205 may be logically divided into portions related to a period of time. For example, a portion may contain all of the programming listings for a particular day. A request for guide data 205 may include sub-requests for a plurality of portions. For example, the request for guide data 205 may include sub-requests for fourteen portions, with each portion including the listings for a respective day of a fourteen day period. Notably, the request module 112 may request data 205 that includes listings for a plurality of days, e.g., two weeks worth of listings, despite making daily requests. Such a pattern of requests may serve a variety of purposes. For example, the pattern of requests allows a viewer to see programming listings for a multi-day period. Moreover, unlike a printed programming guide that also shows multiple days of programming listings, corrections and other changes may be reflected each time the data is refreshed, e.g., each day. Additionally, this scheme provides a failsafe for a day, or days, when fresh programming guide data 205 is unavailable for any reason.

Because of the regularity of the retrieval of the programming guide data 205, any interruption thereof may be symptomatic of a partial or complete service issue affecting the content processing device 104. However, given that guide data 205 may be retrieved for a number of days at a time, any problems developed by the content processing device 104, such as a service issue that prevents the retrieval of fresh programming guide data 205, may not become apparent to the subscribing customer until the conclusion of the time period for which guide data was previously retrieved, e.g., fourteen days. Accordingly, the system 100 may have a period of time, e.g., fourteen days, to proactively troubleshoot the device 104 for partial service issues prior to the issue being noticed by the subscribing customer.

The communications between the request module 112 and the IPG module 150 may be analyzed to recognize anomalies therein. In one exemplary approach, the communications may be analyzed in an on-the-fly manner, or as they occur. In another exemplary approach, the communications may be logged for later analysis. The pattern of communications between the request module 112 and the IPG module 150 for a particular content processing device 104 may be collectively referred to as a retrieval profile 210. Moreover, a model pattern of communications that would occur if the content processing device 104 is functioning properly may be referred to as an expected retrieval profile 215. Accordingly, the retrieval profile 210 may be compared to the expected retrieval profile 215 to detect anomalies. An anomaly may be detected from a lack of correspondence between the retrieval profile 210 and the expected retrieval profile 215.

As noted above, the communications between the request module 112 and the IPG module 150 occur throughout a request-response cycle. Accordingly, some of the communications relate to requests made by the requests module 112, and some of the communications relate to the responses sent by the IPG module 150. Thus, the retrieval profile may be either a request profile 220 or a response profile 225. Similarly, the expected retrieval profile 215 may be either an expected request profile 230 or an expected response profile 225. The request profile 220 may include an indication of what guide data 205 was requested by the content processing device 104, e.g., guide data 205 for a particular time. The response profile 225 may include an indication of whether the retrieval request was fulfilled. For example, the content processing device 104 may send an acknowledgement that that requested guide data 205 was successfully retrieved. The acknowledgement may be recorded in the response profile 225. The detection of anomalies may be based on a lack of correspondence between the request profile 220 and the expected request profile 230 or between the response profile 225 and the expected response profile 235. The detection of an anomaly may result in the content processing device 104 being flagged for troubleshooting. Moreover, the device 104 may be flagged for troubleshooting without the knowledge of the subscribing customer.

Figure 3:
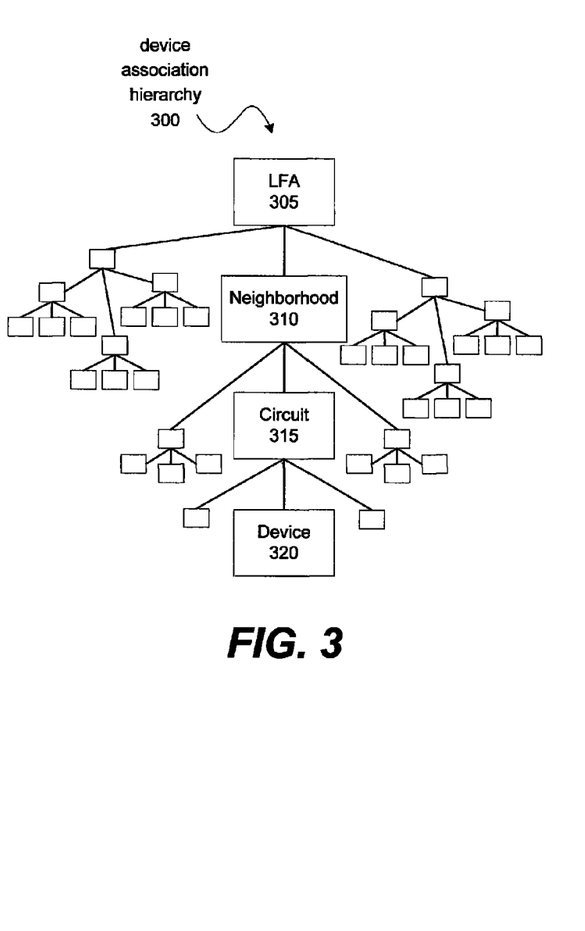
FIG. 3 is an illustrative representation of an exemplary device association hierarchy.

The hierarchical nature of the media distribution network 114 and the customer premises network 101 may result in a service issue affecting more than one content processing device 104. Moreover, the content processing devices 104 affected by a service issue may be related or associated based on the topography of the networks 114, 101. Turning now to FIG. 3, an exemplary device association hierarchy 300 depicts the relationships between content processing devices 104. In one exemplary approach, local franchising authorities (LFAs) may be represented at an LFA level 305 at the highest level of the hierarchy 300. The LFA may be a municipality, or the like, and therefore segment the networks 114, 101 across a geographic and political region. However, in some exemplary approaches, larger geographic regions, e.g., a state or other collection of LFAs, may be represented at an even higher level of the hierarchy 300.

Each LFA may include a plurality of neighborhoods. Accordingly, a neighborhood level 310 may include any fragment of an LFA such as a residential subdivision or development, a street, a block, or a collection thereof. The neighborhood level 310 may be associated with a fiber distribution hub (not show) that splits a fiber into individual customer or subscriber connections. As noted above, the fiber distribution hub may be positioned in the networks 114, 101 between the OLT 126 and the ONT 122. A circuit level 315 of the hierarchy 300 may represent the connection to an individual customer premises network 101, such as a residential or business location of a subscribing customer. In particular, the ONT 122 may define the circuit level 315. A device level 320 may represent particular content processing devices 104 at the customer premises network 101 and connected to a common ONT 122.

Family terminology may be useful in describing the relationships between devices of the hierarchy 300. For example, devices 104 at the device level 320 that are associated with the same ONT 122 at the circuit level 315 may be referred to as sibling devices. Devices that are associated with the same fiber distribution hub at the neighborhood level 310 may be referred to as first cousins. Further, devices that are associated with the same franchising authority at the LFA level 305 may be referred to as second cousins.

Each level of the device association hierarchy 300 may represent a point of control and provide a troubleshooting intervention point. For example, at the LFA level 305, a plurality of fiber distribution hubs (not show) at the neighborhood level 310 may be controllable. At the neighborhood level 310, a plurality of ONTs 122 at the circuit level 315 may be controllable. At the circuit level 315, a plurality of content processing devices 104 at the device level may be controllable.

To address a potential service issue that may cause an anomaly in the retrieval profile as discussed above, the device 104 may need to have restorative measures performed thereon, e.g., by being serviced, restarted, patched, upgraded, etc. Because each level of the hierarchy 300 provides a point of control, the affected device 104 could be serviced by servicing a device at a higher level of the hierarchy 300. For example, a fiber distribution hub at the neighborhood level 310 could be serviced to address a problem at the device level 320. However, servicing a device may be disruptive to any customer that is not already experiencing a service issue. Accordingly, a higher degree of customer service may be achieved by accurately targeting any restorative measures to the smallest possible set of devices 104.

As explained above, an anomaly in the retrieval profile 210 associated with the content processing device 104 may be indicative of a service issue affecting not only the device but also other devices related according to the device association hierarchy 300. Accordingly, after flagging a device 104 for troubleshooting based on a lack of correspondence between the retrieval profile 210 and the expected retrieval profile 215, related or associated devices may be discovered using the device association hierarchy 300. In one exemplary approach, the discovery may broadly identify a large number of associated devices, e.g., all devices associated with a particular LFA at the LFA level 305. While restorative measures could be performed on all of the discovered devices, this may lead to less than optimal customer service.

Accordingly, it may be predicted that the associated devices also require troubleshooting based on the association with the flagged device. The prediction may narrow the set of associated devices that will receive restorative measures. The prediction may be based on empirical analysis of historical service issues. In one exemplary approach, the prediction may be based on the family relationships between devices in the hierarchy 300. For example once flagged for troubleshooting, all second cousin devices may be discovered, e.g., all devices associated at the LFA level 305. However, based on historical or other information, it may be predicted that only first cousin or sibling devices should be subjected to troubleshooting and restorative measures.

The device association hierarchy 300 is not the only source of data available to the system 100 for identifying service issues. As explained above, the communications between the IPG module 150 and the request module 112 may be logged for later analysis. Therefore, the prediction may be confirmed using this retrieval log of communications. For each device that has been predicted to require restorative measures, the retrieval log may be analyzed for an associated retrieval profile 210. The prediction may be confirmed by recognizing a lack of correspondence between the retrieval profile 210 and the expected profile 215. To improve customer service by reducing unnecessary troubleshooting and servicing, any restorative measures may be limited to the initially flagged device and any associated devices that have a confirmed lack of correspondence between the retrieval profile 210 and the expected profile 215.

Servers 142, 144, and 146, PCs 110a-b, and content processing devices 104a-b may be any general purpose computing device, such as a PC, server, or a specialized device. Servers 142, 144, and 146, PCs 110a-b, and content processing devices 104a-b may have software, such as an operating system in addition to the instructions of module 112 of the content processing devices 104a-b. The operating system may also include a network protocol stack, for establishing network connections, e.g., connections to media distribution network 114 and packet network 118.

Servers 142, 144, and 146, PCs 110a-b, and content processing devices 104a-b may employ any of a number of user-level and embedded operating systems known, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., the Apple Mac OS X operating system, the Linux operating system, the Symbian mobile device operating system, the Android mobile stack developed by Google, etc. Computing devices may include any one of a number of computing devices known to those skilled in the art, including, without limitation, a computer workstation, a desktop, notebook, laptop, or handheld computer, mobile phones, smart phones, PDAs, or some other computing device known.

Servers 142, 144, and 146, PCs 110a-b, and content processing devices 104a-b may each include instructions executable by one or more processing elements such as those listed above. Computer-executable instructions may be compiled or interpreted from computer programs created using a variety of programming languages and/or technologies known, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, and volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 4:
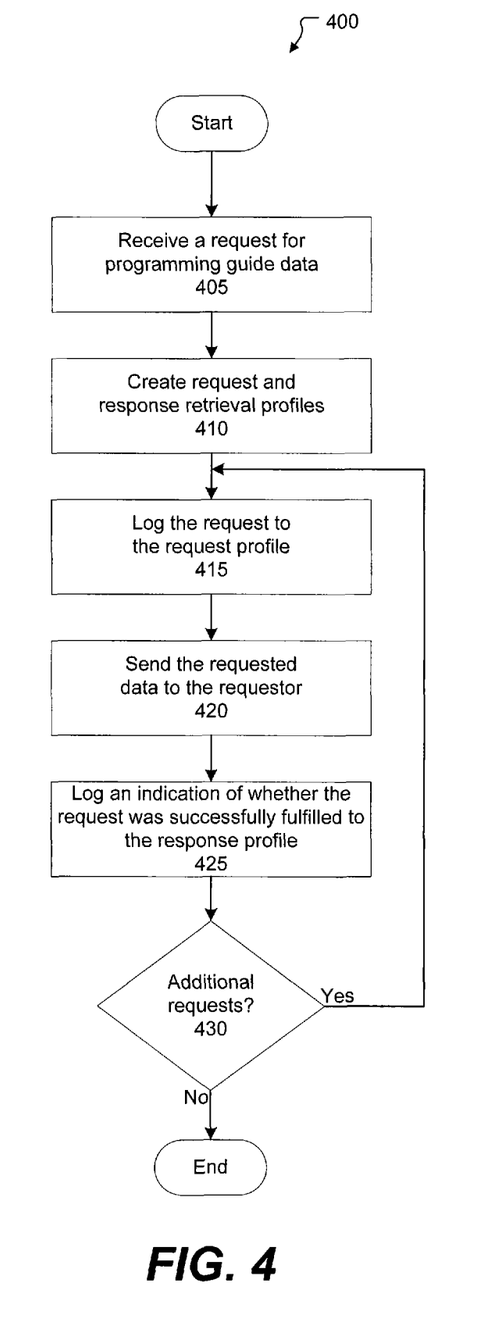
FIG. 4 is a flowchart depicting exemplary steps and decisions related to handling a request for programming guide data.

FIG. 4 illustrates a flowchart of an exemplary process 400 for handling a request for programming guide data 205. The IPG server 142 may include a computer-readable medium having stored instructions for carrying out certain operations described herein, including some or all of the operations described with respect to process 400. For example, some or all of such instructions may be included in the IPG module 150.

The process 400 begins in step 405 in which a request for programming guide data 205 may be received. In one exemplary approach, the IPG module 150 provides a data retrieval interface for receiving the request from the request module 112. The request may correspond to a standard data retrieval protocol, such as the File Transfer Protocol (FTP), the Hyper Text Transfer Protocol (HTTP), etc., or may correspond to a private or customized data interchange protocol. Because the guide data 205 may be arranged by date and time, the request may typically specify a particular day or date range for which data should be retrieved.

Next, in step 410, request and response retrieval profiles 220, 225 may be created. As explained above, the communications between the IPG module 150 and the request module 112 may be logged in a retrieval log for later analysis. The retrieval log may include a series of time stamped line items indicating the particular processing steps that occurred. For example, a line item might indicate the network address of the requesting device 104, the time of the request, and identification the particular data 205 that was requested. In one exemplary approach, the line items may simply be recorded in a text file, or the like, in a time ordered arrangement. However, in another exemplary approach, the line items may be organized or structured according to a particular operation and requestor. For example, the requests and response line items may be structured as request and response profiles 220, 225. Accordingly, in step 410, the request and response profiles 220, 225 may be created or initialized for later filling in steps 415 and 425 as will be discussed below. Similarly, if the line items of the retrieval log are not structured, the step of creating the request and response profiles 220, 225 may be an implicit aspect of respective steps 415 and 425.

Next, in step 415, the request may be logged to the request profile 220. In one exemplary approach, the request may include a plurality of sub-requests for portions of the programming guide data 205. Accordingly, the overall request may be logged in step 410 by creating the request profile 220, and each sub-request may be logged in this step 415.

Next, in step 420, the requested guide data 205 may be sent to the requester. The requested guide data 205 may be transmitted over the networks 114, 101 to the requesting content processing device 104

Next, in step 425, an indication of whether the request was successfully fulfilled may be logged to the response profile 225. For example, upon receipt of the guide data 205, the request module 112 may send an acknowledgment to the IPG module 150 which may be logged to the response profile 225.

Next, in step 430, it may be determined whether additional requests need to be processed. As explained above, the request may include sub-requests for portions of the guide data 205. For example, a day of program listings may be grouped together as a portion. The portion may be requested along with other portions. For example, the request module 112 may be configured to request fourteen days of programming guide data 205. If there are additional requests, the process may return to step 415.

If there are no remaining requests, process 400 may end.

Figure 5:
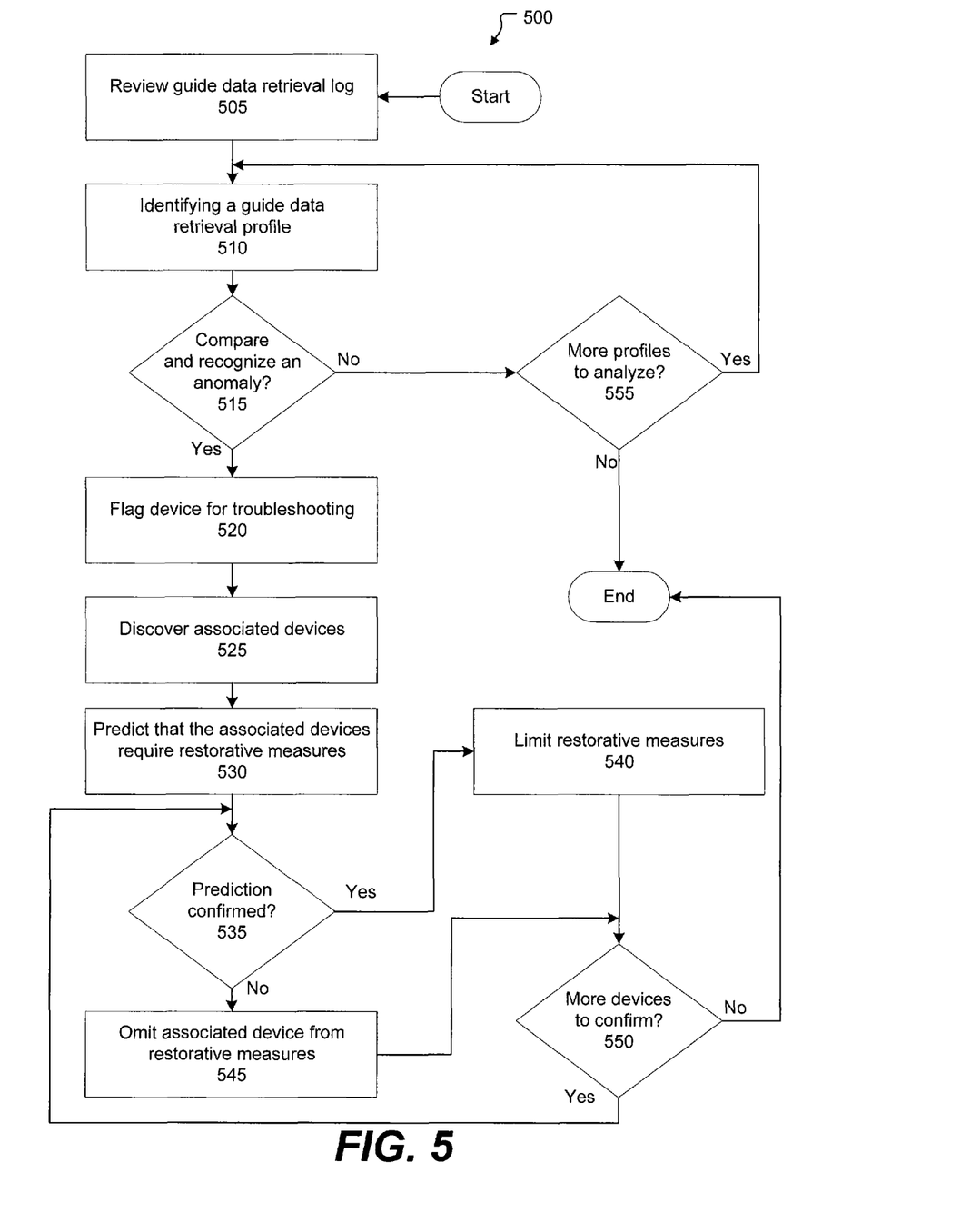
FIG. 5 is a flowchart depicting exemplary steps and decisions related to proactively troubleshooting set top box issues.

FIG. 5 illustrates a flowchart of an exemplary process 500 for proactively troubleshooting set top box issues. The IPG server 142 may include a computer-readable medium having stored instructions for carrying out certain operations described herein, including some or all of the operations described with respect to process 500. For example, some or all of such instructions may be included in the IPG module 150.

The process 500 begins in step 505 in which the guide data retrieval log may be reviewed. The review of the log may be scheduled to occur automatically at a set time. For example, the log may be reviewed once a day. In another exemplary approach, the review of the log may occur in an on-demand manner. For example, a service technician may initiate a review during a customer service call. In another exemplary approach, the review step may be omitted entirely and process 500 may begin in step 510 discussed below. For example, process 500 may be implemented concurrently with the request-response cycle discussed with respect to FIG. 2.

Next, in step 510, a retrieval profile 210 may be identified. In one exemplary approach, the identification may be made from the retrieval log line items or profile structures discussed above with respect to process 400. For example, the retrieval log may be searched for the request profile 220 for a particular device 104. However, in another exemplary approach, the profile 210 may be identified on-the-fly during the guide data 205 request-response cycle. For example, the request for guide data 205 made by the request module 112 may be identified immediately as a request profile 220. In such an approach, the logging steps, e.g., 410, 415, and 425, of process 400 may be omitted.

Next, in step 515, the retrieval profile 210 may be compared to the expected profile 215. A lack of correspondence between the retrieval profile 210 and the expected profile 215 may be recognized as an anomaly indicative of a service issue. Moreover, because the retrieval profile may be either a request profile 220 or a response profile 235, the recognition of an anomaly may be based on a lack of correspondence between the request profile 220 and the expected request profile 230 or between the response profile 225 and the expected response profile 235. If the retrieval profile 210 corresponds to the expected profile 215, the process may skip to step 555 to determine if there are any more profiles 210 to analyze.

In step 520, the content processing device 104 associated with the retrieval profile 210 identified in step 510 may be flagged for troubleshooting, servicing, or other restorative measures. In one exemplary approach, the system 100 may interface with a customer service management system such as a helpdesk or trouble ticket management system for tracking customer service issues. In another exemplary approach, a service technician responsible for the device 104 may be contacted, e.g., by email, instant messaging, or the like.

Next, in step 525, devices associated with the flagged device may be discovered. As explained above with respect to FIG. 3, the device association hierarchy 300 provides the relationships between content processing devices 104. In one exemplary approach, the discovery may broadly identify a large number of associated devices, e.g., all devices associated with a particular franchise authority at the LFA level 305. The franchise authority at the LFA level 305 associated with the flagged device may be identified. Then the hierarchy 300 may be used to identify all associated devices 104 at the device level 320 that descend from the identified franchise authority.

Because it may be undesirable to perform restorative measures on all of the discovered devices, it may be predicted that only certain devices require restorative measures in step 530. The prediction may narrow the set of associated devices that will receive restorative measures. In one exemplary approach, the prediction may be based on the family relationships between devices in the hierarchy 300. For example, it may be predicted that only first cousin or sibling devices should be subjected to restorative measures.

In steps 535-550, the prediction made in step 530 may be confirmed using the retrieval log. For each device that has been predicted to require restorative measures, the retrieval log may be analyzed for an associated retrieval profile 210. In step 535, the prediction may be confirmed by recognizing a lack of correspondence between the retrieval profile 210 and the expected profile 215.

In step 540, any restorative measures may be limited to the initially flagged device and any associated devices that have a confirmed lack of correspondence between the retrieval profile 210 and the expected profile 215.

Similarly, in step 545, devices whose prediction was not confirmed in step 535 may be omitted from the set of devices that require restorative measures.

In step 550, the process may return to step 535 if there are more predictions to confirm. However, if there are no more predictions to confirm, process 500 may end.

In step 555, the process may return to step 510 if there are more profiles 210 to analyze. However, if there are no more profiles 210 to analyze, process 500 may end.

Accordingly, exemplary a system for proactively troubleshooting set top box (STB) issue has been described. The behavior and activities of content processing devices 104 (e.g., STBs) may be monitored to proactively detect service issues prior to receiving a service call from a customer. Because the content processing device 104 may communicate with other elements of the multimedia subscriber system (e.g., the IPG server 142) in an anticipated and regular manner, logs of communications may be used to recognize anomalies indicative of service issues. Comparisons between an expected retrieval profile 215 of communications and an actual retrieval profile 210 of communications may be made in order to recognize the anomalies and subsequently flag the STB for troubleshooting. The hierarchical network architecture of the multimedia subscriber system may allow for a problem with one device 104 to predict a problem with another device associated with common node of the network at a higher level in the device association hierarchy 300. The device association hierarchy 300 may be analyzed to discover other devices 104 that may be in need of troubleshooting and restorative measures. In order to reduce the number of devices 104 subjected to restorative measures, a prediction of which devices are actually affected by a service issue may be made. To confirm the prediction, logs of the communications between the discovered devices 104 and the interactive programming guide server 142 may reviewed for anomalies. Confirming the prediction may allow restorative measures to be limited to only those devices with actual service issues, which may improve customer service by avoiding unnecessary, and potentially disruptive, device maintenance.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claims.

Accordingly, it is to be understood that the above description is intended to be illustrative and not restrictive. Many systems and applications other than the examples provided would be apparent upon reading the above description. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future systems. In sum, it should be understood that the disclosure is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites explicitly to the contrary.

What is claimed is:

1. A method comprising:
   identifying, by way of a computing device, a guide data retrieval profile of a requesting device;
   comparing the guide data retrieval profile to an expected profile; flagging the requesting device for troubleshooting based on a lack of correspondence between the guide data retrieval profile and the expected profile;
   discovering at least one associated device using a device association hierarchy based on the location of the flagged requesting device;
   wherein the device association hierarchy includes a plurality of levels, each level of the device association hierarchy representing a point of control and providing a troubleshooting intervention point;
   predicting that the associated device requires troubleshooting based on the associated device and the flagged requesting device being associated with a common node at a higher level of hierarchy; and
   confirming the predicting including:
      analyzing a retrieval log for a second retrieval profile, the second retrieval profile related to the associated device, and
      recognizing a lack of correspondence between the second retrieval profile and the expected profile; and
      initiating restorative measures to the flagged requesting device and the associated device subject to the confirming.

2. The method according to claim 1, further comprising:
   receiving a request for guide data; and
   logging at least one of the retrieval request and an indication of whether the retrieval request was fulfilled.

3. The method according to claim 1, further comprising representing the guide data retrieval profile as one of a request profile indicative of requested guide data and a response profile indicative of whether the requested guide data was successfully provided to the requesting device.

4. The method according to claim 1, further comprising including a plurality of sub-requests for portions of the guide data with the guide data retrieval and expected profiles.

5. The method according to claim 1, wherein the device association hierarchy includes a plurality of location levels, the associated device and flagged requesting device being associated with at least one of the same location levels.

6. The method according to claim 5, wherein the plurality of location levels include a first location level, the first location level including at least one other location level.

7. The method according to claim 6, wherein one of the associated device and the flagged requesting device is associated with the first location level, and the other of the associated device and the flagged requesting device is associated with the other location level.

8. The method according to claim 5, further comprising performing restorative measures at the location level associated with the flagged requesting device and the associated device.

9. The method accordingly to claim 1, further comprising performing restorative measures on the associated device in response to the association with the flagged requesting device.

10. A method comprising:
    reviewing, by way of a computing device, a retrieval profile of a requesting device from a retrieval log of programming guide data;
    recognizing at least one anomaly in the retrieval profile based on a lack of correspondence between the retrieval profile and an expected profile;
    flagging the requesting device for troubleshooting based on the anomaly;
    discovering at least one associated device using a device association hierarchy based on the location of the flagged requesting device; wherein the device association hierarchy includes a plurality of levels, each level of the device association hierarchy representing a point of control and providing a troubleshooting intervention point;

predicting that the associated device requires troubleshooting based on the associated device and the flagged requesting device being associated with a common node at a higher level of hierarchy; and confirming the predicting including:
- analyzing a retrieval log for a second retrieval profile, the second retrieval profile related to the associated device, and
- recognizing a lack of correspondence between the second retrieval profile and the expected profile; and
- limiting restorative measures to the flagged requesting device and the associated device subject to the confirming.

11. The method according to claim 10, further comprising: receiving a request for guide data; and
logging at least one of the retrieval request and an indication of whether the retrieval request was fulfilled.

12. The method according to claim 10, further comprising representing the retrieval profile as one of a request profile indicative of requested guide data and a response profile indicative of whether the requested guide data was successfully provided to the requesting device.

13. The method according to claim 10, further comprising including a plurality of sub-requests for portions of the guide data with the retrieval and expected profiles.

14. A system comprising:
a media distribution network including a remote requesting device; and
a programming guide server configured to:
- identify a guide data retrieval profile of the remote requesting device; compare the guide data retrieval profile to an expected profile;
- flag the remote requesting device for troubleshooting based on a lack of correspondence between the guide data retrieval profile and the expected profile;
- discover at least one associated device using a device association hierarchy based on the location of the remote requesting device; wherein the device association hierarchy includes a plurality of levels, each level of the device association hierarchy representing a point of control and providing a troubleshooting intervention point;
- predict that the associated device requires troubleshooting based on the associated device and the remote requesting device being associated with a common node at a higher level of hierarchy; and
- confirm the predicting including:
  - analyzing a retrieval log for a second retrieval profile, the second retrieval profile related to the associated device, and
  - recognizing a lack of correspondence between the second retrieval profile and the expected profile; and
  - initiating restorative measures to the flagged requesting device and the associated device subject to the confirming.

15. The system according to claim 14, wherein the programming guide server is further configured to:
receive a request for guide data; and
log at least one of the retrieval request and an indication of whether the retrieval request was fulfilled.

16. The system according to claim 14, wherein the programming guide server is further configured to represent the guide data retrieval profile as one of a request profile indicative of requested guide data and a response profile indicative of whether the requested guide data was successfully provided to the remote requesting device.

17. The system according to claim 14, wherein the programming guide server is further configured to include a plurality of sub-requests for portions of the guide data with the guide data retrieval and expected profiles.

* * * * *